United States Patent [19]

Blair, Jr.

[11] 4,067,098
[45] Jan. 10, 1978

[54] METHOD OF MANUFACTURING BRAKE DRUMS

[75] Inventor: James W. Blair, Jr., Dearborn, Mich.

[73] Assignee: Kelsey-Hayes Company, Romulus, Mich.

[21] Appl. No.: 677,825

[22] Filed: Apr. 16, 1976

[51] Int. Cl.² .............................................. B23P 13/04
[52] U.S. Cl. ........................................ 29/558; 29/406; 29/527.6; 29/DIG. 26
[58] Field of Search .............. 29/558, DIG. 26, 527.6, 29/557, 406, 159 R, 159.01, 159.3, 159.03

[56] References Cited

U.S. PATENT DOCUMENTS

| | | | |
|---|---|---|---|
| 1,742,193 | 1/1930 | Bell | 29/558 |
| 1,954,665 | 4/1934 | Dake | 29/527.6 X |
| 2,476,151 | 7/1949 | Jeune | 29/558 |
| 2,960,765 | 11/1960 | Barrett | 29/558 X |
| 3,307,251 | 3/1967 | Magyar | 29/406 |

*Primary Examiner*—Victor A. DiPalma
*Attorney, Agent, or Firm*—Harness, Dickey & Pierce

[57] ABSTRACT

A method of manufacturing brake drums or the like and apparatus therefor that minimizes scrap rates by improving as-manufactured balance. In accordance with the disclosed method, the casting rim of the brake drum is located in a press by centering the drum relative to its outer surface. Locating holes are then accurately formed in the drum center by the press prior to machining of the drum inner surface. The subsequent machining operation on the drum inner surface is accomplished by locating the drum accurately via the locating holes formed in the press operation.

7 Claims, 6 Drawing Figures

METHOD OF MANUFACTURING BRAKE DRUMS

BACKGROUND OF THE INVENTION

This invention relates to a method for making brake drums and an apparatus therefor.

Brake drums for vehicular braking systems have machined cylindrical inner surfaces that form the engaging surfaces for the brake shoes. The axis of rotation of the drum is determined by one or more locating holes formed in the drum center. It is important that the machined cylindrical surface be truly concentric with the locating hole or holes. Conventionally it has been the practice to machine the cylindrical inner surface first and then form the locating holes subsequently. Since the loading of the tool on the part during te machining operation is quite heavy, large clamping forces must be employed to hold the drum during its machining operation. This results in frequent damage to the clamping tools and/or distortion of the drum during machining. Either of these factors results in the cylindrical surface being formed eccentrically and imbalance conditions result. Quite frequently the degree of imbalance is so great that it is impossible to balance the drum and it must be scrapped.

It is, therefore, a principle object of the invention to provide an improved method for making brake drums or the like.

It is another object of the invention to provide an improved apparatus for manufacturing brake drums.

It is a still further object of the invention to provide an improved method and apparatus for manufacturing brake drums with a high degree of accuracy.

SUMMARY OF THE INVENTION

This invention is adapted to be embodied in a method for making brake drums or the like having a drum rim with an inner cylindrical surface to be machined, an outer unmachined surface, and a drum center in which at least one locating hole is to be formed. The method comprises the steps of locating the drum relative to a forming machine by using the unmachined outer surface of the drum as a locating surface and performing a forming operation on the locating hole of the thus located drum to accurately determine the locating surface of the locating hole. The inner surface of the drum is then machined by locating the drum by the locating surface of the locating hole.

Another feature of the invention is embodied in an apparatus for performing the method as described in the preceding paragraph. Such an apparatus has gripping and locating means for engaging the unmachined outer surface of the drum rim and forming means for forming the locating hole.

BRIEF DESCRIPTION OF THE DRAWINGS

FIG. 4 is an enlarged elevational view taken in the direction of the arrow 4 in FIG. 1.

DETAILED DESCRIPTION OF THE PREFERRED EMBODIMENTS

Figure 6:
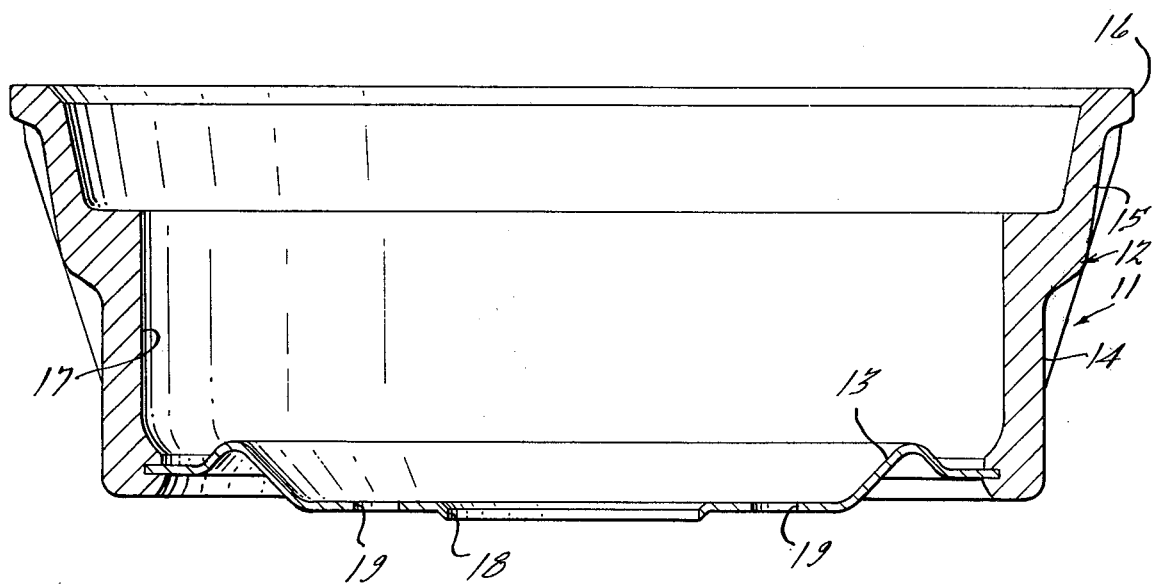
FIG. 6 is a view showing a brake drum formed in accordance with the method of the invention.

This method is generally adapted for use in making brake drums, which brake drums are illustrated in FIG. 6 and identified generally by the reference numeral 11. The brake drum 11 is comprised of a composite assembly consisting of a cast drum rim 12 and a formed steel center 13. The center 13 is positioned in the mold when the rim portion 12 is cast and thus is mechanically locked to the rim 12. The outer surface of the rim 12 is comprised of a first, generally cylindrical section 14 which merges into a larger diameter cylindrical section 15 terminating in a flange 16. The inner surface of the drum rim cylindrical portion 14 is machined to form a cylindrical inner surface 17 that cooperates with the linings of the brake shoes during braking operation.

The drum center 13 is formed with a cylindrical center opening 18 around which are spaced a plurality of bolt holes 19. Either the center hole 18 or the bolt holes 19 may be used to locate the brake drum 11 for rotation about its rotational axis, as is well known in the art.

Previous methods for making the brake drums 11 have employed the first machining operation step of turning the drum inner surface 17. This is done by clamping the cylindrical outer surface 14 of the drum in a plurality of jaws of a turning machine. Since the drum rim 12 is cast, the surface 14 will be an as-cast surface. Due to the high machining loads encountered the clamping operation requires the exertion of considerable pressure. Thus, the drum may be distorted and/or jaw inserts which clamp the drum may become damaged. Either of the aforenoted conditions will result in eccentricity of the inner surface 17 relative to the cylindrical surface 14. With this prior art method, the locating holes 18 or 19 are formed subsequently, locating the drum 11 relative to either the inner or outer surfaces 17 or 14, respectively. In either event, unbalance may well occur when the aforenoted detrimental conditions exist. Quite often, the degree of imbalance is so great that the drum cannot be satisfactorily balanced for use and high scrap rates result.

In connection with the method for performing this invention, the locating openings 18 and/or 19 are formed first before the drum inner suface 17 is machined. The machining operation is then centered by the accurately formed locating hole or holes. This method has been found to substantially reduce scrap rates and to considerably reduce the resulting unbalance of the drum.

An apparatus for performing this method is identified generally by the reference numeral 21. The apparatus 21 includes a tool that is adapted to be used in conjunction with a press. For the most part, the construction of the tool 21 is conventional and, for this reason, only sufficient parts of the tool 21 will be described so as to permit an understanding of the invention.

The tool 21 includes a fixed lower plate assembly 22. Positioned at the center of the lower plate assembly 22 is a restrike die 23 having an appropriately configured forming surface 24. The restrike die 23 loosely supported upon a horizontally disposed surface 25 of the base plate 22 and is, therefore, capable of relatively free transverse movement.

Positioned centrally of the restrike die 23 and affixed to the base plate 22 is a die block 26 having a central die insert 27 and a plurality of surrounding die inserts 28. The inserts 28 are equal in number and spacing to the bolt holes 19 in the drum center 13.

Five fixed rest buttons 29 are secured to the base plate 22.

Surrounding an upstanding central projection of the base plate 22 is a floating assembly, indicated generally by the reference numeral 31. The floating assembly 31 is supported relative to the base plate 22 by means of a pluraltiy of die springs 32. A three-jaw equalizing chuck is provided on the floating assembly 31. This comprises jaws 33 that are supported for pivotal movement on the assembly 31 by respective pivot pins 34. Each jaw carries an insert 35 that is fixed to the jaws 33 by means of screws 36. The inserts 35 carry a pair of locating buttons 37 which, as will become apparent, contact the cylindrical surface 14 of the drum 11 to centralize it in the tool 21.

Figure 1:
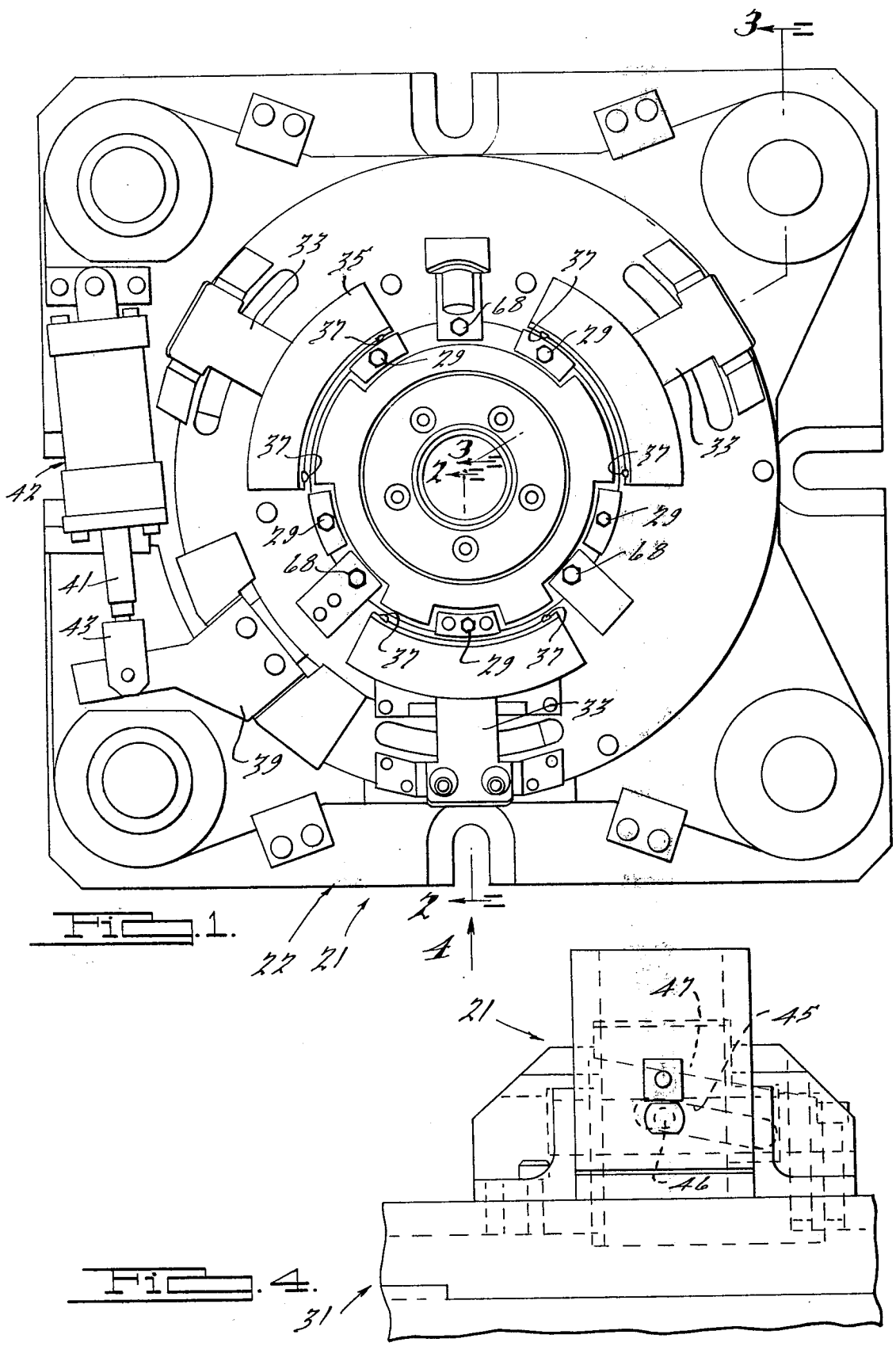
FIG. 1 is a top plan view of the lower die assembly of a forming machine embodying this invention and adapted to perform the method according to the invention.

Journaled for rotation in the assembly 31 is a jaw actuating ring 38. Affixed to the ring 38 is an outstanding arm 39 (FIG. 1) that is connected to the piston rod 41 of a pneumatic cylinder 42 by means of a trunnion 43. Actuation of the cylinder 42 will cause rotation of the jaw actuating ring 38.

Carried by the jaw actuating ring 38 are three upstanding cam members 44 in registry with the respective jaws 33. The cam members 44 each have an inclined cam slot 45 into which the follower pin 46 of each of the jaws 33 extends. The upper end of the cam members 44 is formed with an inclined cam surface 47 that cooperates with a cam follower 48 that is affixed to the respective jaws 33. As will become apparent, the cam surfaces 47 operate the jaws 33 in the clamping direction and the cam slots 45 operate the jaws 33 to the released position.

Associated with the ram of the press is a first ring assembly, indicated generally by the reference numeral 51. The ring assembly 51 has a central opening 52 in which a punch carrier 53 is slidably supported. The punch carrier 53 includes a first punch 54 that cooperates with the die insert 27 to complete a forming operation with the center opening 18 of the drum center 13. Surrounding the punch 54 are a plurality of punches 55 that cooperate with the die inserts 28 to provide the final forming operation for the bolt holes 19.

Surrounding the punch carrier 53 is an upper restrike die 56 in which openings 57 are formed to pass the punches 55. A stripper ring 58 is juxtaposed to the restrike die 56 and is slidably supported relative to the ring 51. Elastomeric members 59 are interposed between the stripper ring 58 and the ring 51 to assist in the stripping operation, as will become apparent.

Figure 5:
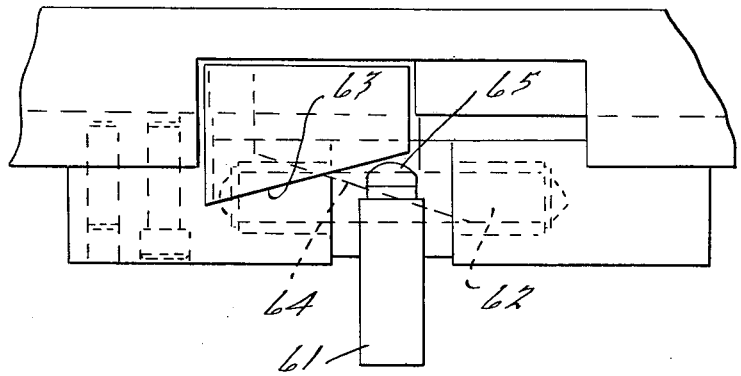
FIG. 5 is an enlarged elevational view taken in the direction of the arrow 5 in FIG. 2.

A plurality of lift out fingers 61 are pivotally supported by the ring 51 by means of pivot pins 62. The lift out fingers 61 are pivoted between a retracted and an operative position by means of inclined cams 63 and 64 (FIG. 5) that cooperate with cam followers 65 and 66 affixed to opposite sides of the fingers 61. The cams 63 and 64 are affixed to a cam drive ring 67 that is rotated by a cylindrical assembly (not shown) similar to the cylindrical assembly 42.

OPERATION

Figure 2:
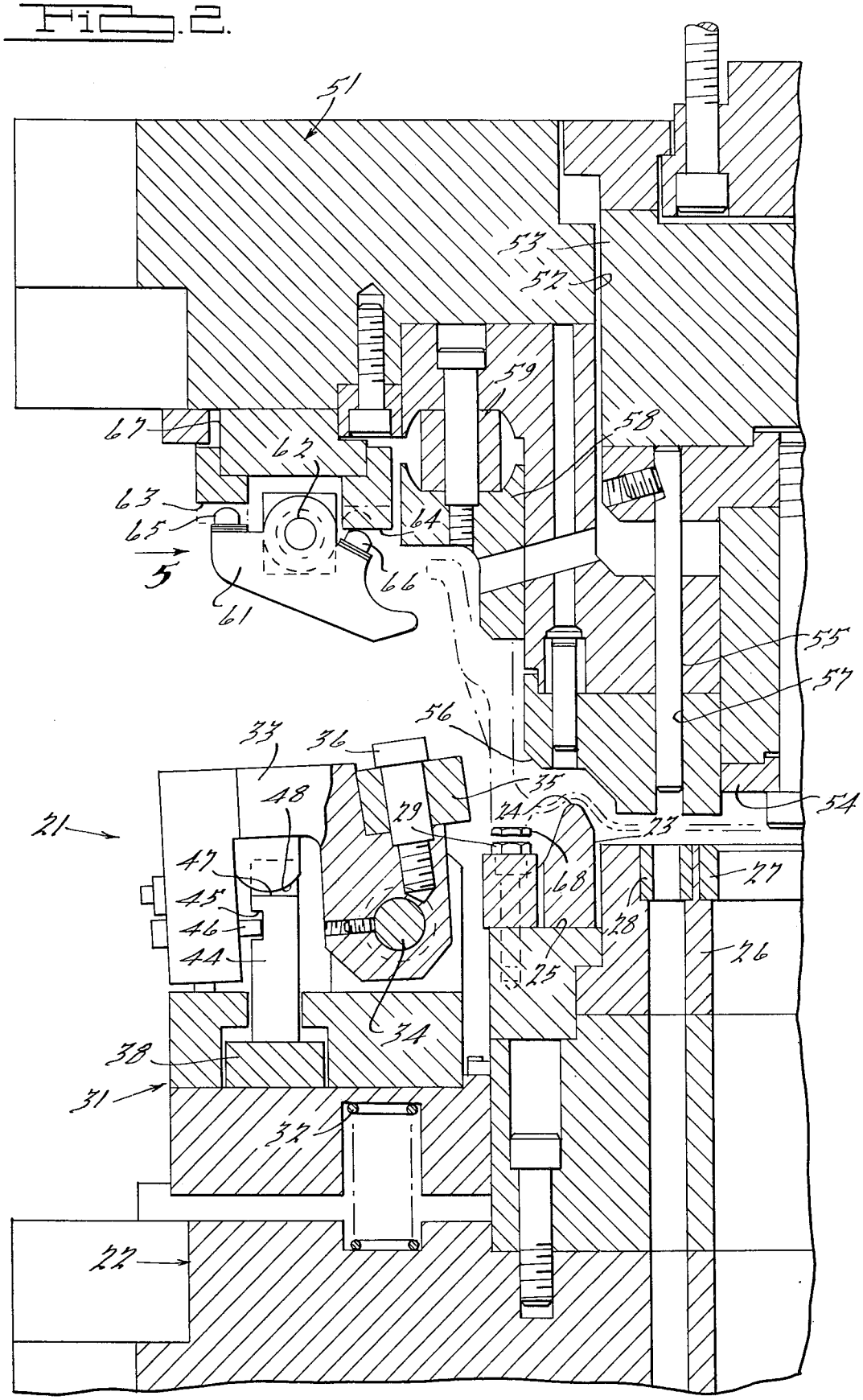
FIG. 2 is an enlarged cross-sectional view taken generally along the line 2—2 of FIG. 1 and shows the apparatus in a loading position.

FIG. 2 shows the tool 21 in position slightly after the initiation of the working cycle. At this point, an as-cast drum 11 is positioned by an operator or automatically onto the lower die assembly. The drum is supported by three floating preliminary rest buttons 68 that are affixed in any suitable manner to the floating ring 31. These rest buttons 68 perform the initial axial location of the drum assembly 11. The pneumatic cylinder 42 is then actuated to rotate the cam actuating ring 38 and cause the jaws 33 to pivot to their engaged position. When this occurs, the locating buttons 37 will contact the drum surface 14 and provide radial location for it.

The upper ram then commences its downward movement until the restrike die 56 contacts the inner surface of the drum center 13. Continued downward movement of the ram causes the entire drum assembly 14 to move downwardly along with the floating assembly 31 against the action of the die springs 32. As this movement occurs, the drum 13 is brought to bear against the fixed rest buttons 68 to complete the axial location. Continued downward movement of the ram causes the restrike die 56 to cooperate with the floating lower restrike die 23 to complete the forming operation of the drum center 13. Once the downward movement of the assembly 51 is completed, the punch carrier 53 continues to move downwardly so that the punches 54 and 55 perform their forming operation. It should be noted that, at this time, the drum 14 will be accurately located by the action of the locator jaws 33.

Figure 3:
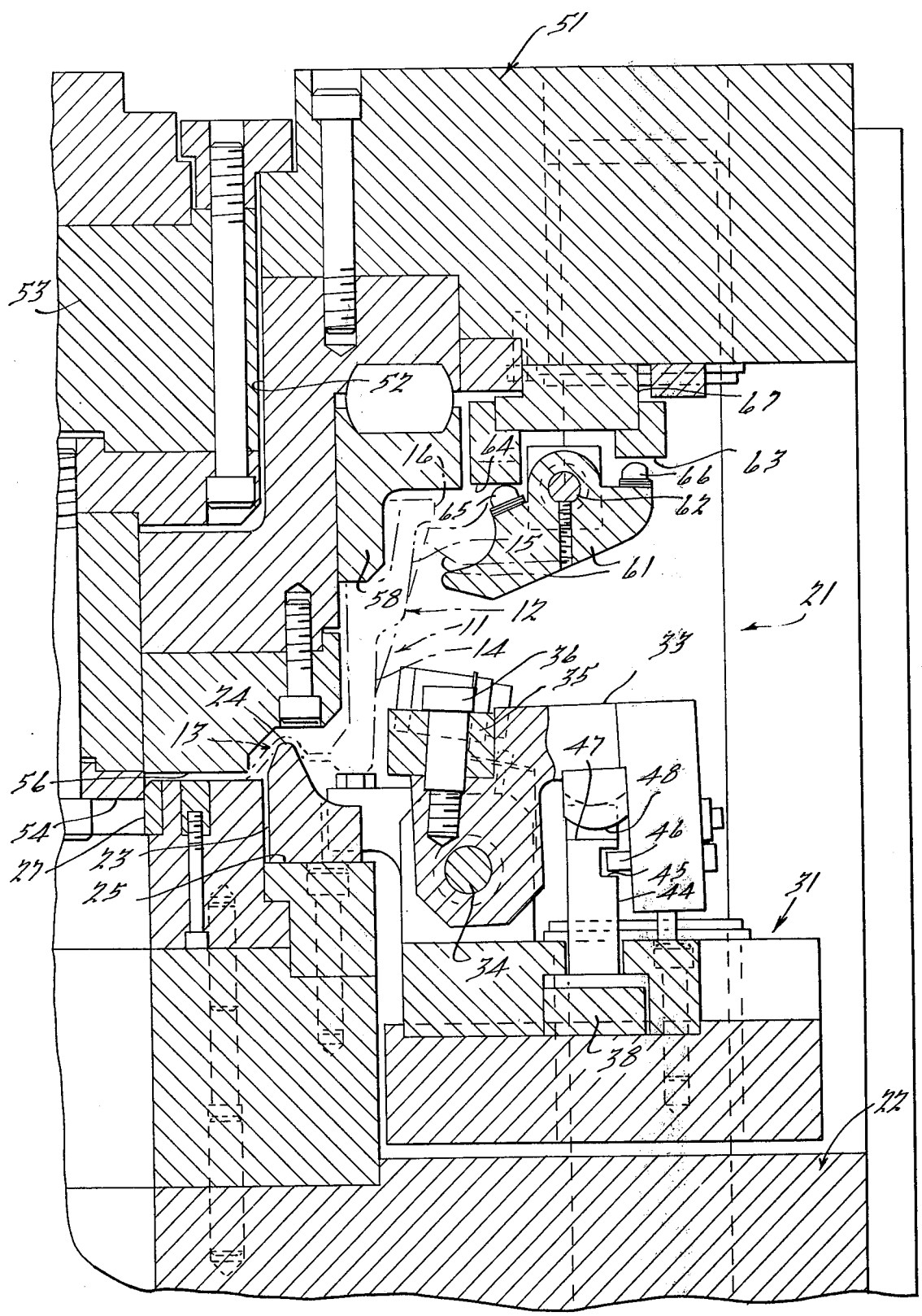
FIG. 3 is an enlarged cross-sectional view, taken generally along the line 3—3 of FIG. 1, and shows the apparatus immediately after the completion of the forming operation.

Now that the forming operation is completed, the upper ram assemblies retract. Prior to this, however, the cam drive ring 67 is rotated so that the cam surface 63 pivots the lift out fingers 66 from their retracted position to a position in which they will contact the rim 16 of the drum 11 as shown in the dotted line position of FIG. 3. Simultaneously, the cam drive ring 38 is rotated so that the cam slot 45 pivots the jaws 33 to their released position. Upward movement of the upper ram assembly will, therefore, lift the formed drum 11 from the die assembly whereupon the fingers 61 are released.

From the foregoing it should be readily apparent that the method and apparatus described permit accurate location of the respective locating holes 18 or 19 of the drum center 13. This is accomplished without the necessity of high clamping forces on the drum rim 12 which might cause distortion or damage to the locating buttons 37.

Subsequently, the drum 11 is placed into a turning machine so that the drum inner surface 17 may be machined. When so machined, the drum 11 is located by using the respective of the locating holes 18 and/or 19.

It is to be understood that the foregoing description is that of a preferred embodiment of the invention. Various changes and modifications may be made without departing from the spirit and scope of the invention as defined by the appended claims.

I claim:

1. A method of making a brake drum or the like having a drum rim with an inner cylindrical surface to be machined, an outer unmachined surface and a drum center in which at least one locating hole is to be formed, which locating hole determines the rotational axis of the drum, said method comprising the steps of locating the drum relative to a forming machine by using the unmachined outer surface of the drum as a locating surface prior to finishing of the inner surface into the inner cylindrical surface, performing a forming operation to form the final dimensions of the locating hole of the located drum to accurately determine the locating surface thereof and establish the axis of rotation of the drum relative to the unmachined outer surface and finish machining the rim inner surface about the axis of rotation determined by the finished locating hole into the inner cylindrical surface.

2. A method of making a brake drum or the like as set forth in claim 1 wherein the forming machine forms a hole in the center of the drum center.

3. A method of making a brake drum or the like as set forth in claim 2 further including the step of forming a plurality of holes around the center hole.

4. A method of making a brake drum or the like as set forth in claim 3 wherein the holes are pierced.

5. A method of making a brake drum or the like as set forth in claim 1 wherein the drum is located radially by clamping its outer circumference.

6. A method of making a brake drum or the like as set forth in claim 5 further including the step of performing a restrike operation on the drum center when so located.

7. A method of making a brake drum or the like as set forth in claim 5 further including the step of axially locating the drum along its axis during the forming operation.

* * * * *